Patented Nov. 8, 1938

2,136,000

UNITED STATES PATENT OFFICE 2,136,000

TERPENE ALCOHOL ESTERS OF DIBASIC ACIDS AND METHOD OF PRODUCING

Joseph N. Borglin, Wilmington, Del., assignor to Hercules Powder Company, Wilmington, Del., a corporation of Delaware No Drawing. Application December 18, 1934, Serial No. 758,033

9 Claims. (Cl. 260—99)

This invention relates to terpene esters of dibasic acids and method for their production.

Heretofore it has been known to esterify terpene alcohols and to subsequently purify the esters by distillation under reduced pressure, or by crystallization from alcohol (see United States Patent No. 1,800,862, Humphrey). Such procedure has not proved satisfactory in that the products are dark colored and hence undesirable for many uses.

Now, in accordance with this invention there is provided a method for the production of esters of terpene alcohols which is efficient and economical and which is productive directly of a terpene ester product which is non-crystalline and of a light color, novel characteristics differentiating it from the prior art and which adapt it to wide use in the commercial arts, for which similar esters were not heretofore adaptable.

In accordance with this invention, terpene alcohols, pine oil containing terpene alcohols, or a pine oil cut rich in terpene alcohols, are subjected to treatment for the removal of oxidation products and the terpene alcohols then esterified under conditions which will avoid oxidation, as by exclusion of air through carrying out the reaction in an inert atmosphere. In the esterification the use of toluene, or an equivalent, to aid in the removal of water of reaction will desirably be used. On completion of the esterification the product will desirably be distilled from the reaction mass and the distillation will desirably be carried out with avoidance of oxidation, as by effecting the distillation in an inert atmosphere. The product will be non-crystalline and of a light color.

More specifically, in accordance with this invention pine oil, or a pine oil cut rich in terpene alcohols, may be subjected to treatment for the removal of tertiary terpene alcohols before esterification. The tertiary terpene alcohols may be removed from the pine oil, or pine oil cut, by effecting their dehydration, or splitting into terpene hydrocarbons and water, prior to treatment of the pine oil, or pine oil cut, for the removal of oxidation products, by heating the pine oil, or pine oil cut, with a dehydrating agent, such as fuller's earth, iodine, sodium acid sulphate, etc.

Again, if it is desirable to avoid the presence of ethers, such as anethol and methyl chavicol, in the product, the pine oil, or pine oil cut, may be subjected to treatment to isomerize the methyl chavicol to anethol and fractionated, leaving the anethol in the residue. The isomerization of methyl chavicol to anethol may be accomplished, for example, by refluxing the pine oil, or pine oil cut, with, for example, alcoholic potash, and the pine oil, or pine oil cut may be, freed from anethol, after the refluxing, by decanting, water washing and fractionating at a temperature such that the anethol and high boiling ethers will remain in the residue.

In proceeding in accordance with this invention, pine oil containing terpene alcohols may be used, though it will be preferable to use a pine oil cut rich in terpene alcohols, say, for example, a pine oil cut boiling within the range 200° C. to 220° C., though the particular boiling range of the cut will not be material.

The pine oil, or pine oil cut, will be first treated for the removal of oxidation products and such treatment may, for example, involve steam distilling the pine oil, or pine oil cut, from caustic soda, by dry distilling from caustic, or by any other effective procedure.

The pine oil, or pine oil cut, after removal of oxidation products, will be esterified with use of any suitable polybasic acid or anhydride, as, for example, phthalic acid or anhydride, maleic acid or anhydride, fumaric acid, sebacic acid, etc.

The esterification will be carried out in any usual manner, using, if desired, any suitable esterification catalyst. However, essentially the esterification will be carried out with avoidance of oxidation and such may be accomplished by effecting the esterification in an inert atmosphere, as, for example, in an atmosphere of hydrogen, nitrogen, carbon dioxide, or other inert gas.

Where it is desirable to remove ethers, such as anethol and methyl chavicol, from the pine oil, or pine oil cut, as has been indicated, such is readily accomplished, for example, by isomerizing the methyl chavicol, for example, by refluxing the pine oil, or pine oil cut, with alcoholic potash, decanting, water-washing and fractionating the pine oil, or cut, from the high boiling ethers, before treatment for the removal of oxidation products.

Where removal of the tertiary alcohols from pine oil, or pine oil cut, is desired, such, as has been indicated, can be accomplished by effecting dehydration of the tertiary alcohols by, for example, heating the pine oil, or pine oil cut, with fuller's earth, iodine, sodium acid sulphate, etc., prior to treatment of the pine oil, or pine oil cut, for removal of oxidation products.

In effecting dehydration of the tertiary alcohols in the pine oil, or pine oil cut, a temperature within the range about 100° C. to about 200° C. may be used and in effecting the esterification a temperature within the range about 125° C. to about 250° C. will be found satisfactory. Generally speaking, in carrying out the method in accordance with this invention, temperatures in excess of about 180° C. will be avoided in order to avoid carbonization, which will have a discoloring effect upon the ultimate product. The esterification will desirably be carried out with distillation over of oils and water of reaction in order to avoid discoloration of the product and desirably an agent, as toluene, or the like, will be used to aid in the removal of water of reaction.

The inert and unreacted materials such as hydrocarbons, excess pine oil alcohols, etc. on completion of the esterification will desirably be distilled from the reaction mass in an inert atmosphere.

It will be understood that the method in accordance with this invention, while more particularly adaptable for the treatment of terpene alcohols, and more especially of secondary terpene alcohols as present in pine oil, or in a pine oil cut rich in terpene alcohols, is adaptable for the treatment of terpene alcohols as such. It will be appreciated that the product, where the method is applied to the treatment of pine oil, or a pine oil cut, will comprise a mixture of terpene alcohol esters, since pine oil and pine oil cuts rich in terpene alcohols will contain a plurality of terpene alcohols, as, for example, borneol and fenchyl alcohol. Generally speaking, in the esterification of terpene alcohols as present in pine oil, or in a pine oil cut, the tertiary alcohols will be dehydrated rather than esterified, when the tertiary terpene alcohols are not dehydrated by treatment of the pine oil, or a pine oil cut, prior to esterification, the esters thereof will be present in the product.

As more specifically illustrative of the practical adaptation of the method in accordance with this invention for the production of products in accordance therewith, for example, 1,000 parts of a pine oil cut boiling within the range 195° C. to 230° C. and containing, for example, 54% secondary alcohols and 3% tertiary alcohols, is steam distilled from caustic soda. To the dry distillate is then added 250 parts of phthalic anhydride and the reagents heated for about 80 hours at a temperature of about 180° C., the reaction mass being blanketed with carbon dioxide to prevent oxidation. Desirably, toluene will be added in small quantities from time to time to assist in the removal of water of reaction. The water of reaction will be distilled off together with oils, which will distill off at the temperature used. The oils will desirably not be returned to the reaction mass, since they will become partially oxidized and will effect discoloration of the product. In proceeding, any suitable form of apparatus may be used and where the apparatus used is so designed as to exclude the possibility of entry of air, the oils distilled off may be returned to the reaction mass.

On completion of esterification, the product will be steam distilled in an inert atmosphere, as carbon dioxide, to remove hydrocarbons and excess terpene alcohols from the product, which remains as a pale colored, amorphous residue. By the procedure outlined a product amounting to 718 parts, or a yield of 97%, will be obtained. The product will be amorphous, will have a color grade of H+ (rosin, standard ⅞" cube) and an acid number of 52.

The product obtained by the above procedure may be distilled under reduced pressure to obtain a 90% yield of ester which will have a color grade WW+ (rosin, standard ⅞" g.) and an acid number of 20.

In the procedure described above the 3% tertiary alcohols obtained from the original pine oil cut will be largely dehydrated during the esterification and will cause some discoloration of the ultimate product. Such discoloration as may result from such cause may be avoided by effecting dehydration of the tertiary alcohols.

It will be understood that where in the claims appended hereto the term "pine oil" is used, it is intended that such term includes as equivalents pine oil as such and also pine oil cuts more or less rich in secondary terpene alcohols.

What I claim and desire to protect by Letters Patent is:

1. The method of producing a dicarboxylic acid ester of a terpene alcohol which includes esterifying a terpene alcohol while avoiding oxidation in the reaction mass.

2. The method of producing a dicarboxylic acid ester of a terpene alcohol which includes esterifying a terpene alcohol in an inert atmosphere.

3. The method of producing a dicarboxylic acid ester of a secondary terpene alcohol which includes esterifying a secondary terpene alcohol in an inert atmosphere.

4. The method of producing a dicarboxylic acid ester of a terpene alcohol which includes esterifying a terpene alcohol in an inert atmosphere and distilling the resultant ester from the reaction mass in an inert atmosphere.

5. The method of producing a dicarboxylic acid ester of a terpene alcohol which includes removing oxidation products from pine oil and reacting the pine oil with a dicarboxylic acid to form an ester of a terpene alcohol contained therein while avoiding oxidation of the pine oil.

6. The method of producing a dicarboxylic acid ester of a terpene alcohol which includes removing oxidation products from pine oil and reacting the pine oil with a dicarboxylic acid to form an ester of a terpene alcohol contained therein in an inert atmosphere.

7. The method of producing a dicarboxylic acid ester of a secondary terpene alcohol which includes dehydrating tertiary terpene alcohols in pine oil, removing oxidation products from the pine oil and reacting the pine oil with a dicarboxylic acid to form an ester of a secondary terpene alcohol contained therein.

8. The method of producing a dicarboxylic acid ester of a terpene alcohol which includes distilling pine oil from alkali to remove oxidation products therefrom and reacting the distilled pine oil with a dicarboxylic acid to form an ester of a terpene alcohol contained therein while avoiding oxidation of the pine oil.

9. The method of producing a dicarboxylic acid ester of a terpene alcohol which includes steam distilling pine oil from an alkaline solution to remove oxidation products therefrom and reacting a terpene alcohol in the distilled pine oil with a dicarboxylic acid to form an ester of a terpene alcohol contained therein while avoiding oxidation of the pine oil.

JOSEPH N. BORGLIN.